United States Patent
Drummond

[11] Patent Number: 5,928,401
[45] Date of Patent: Jul. 27, 1999

[54] PROCESS OF MAKING FIBERS WITH A ROTARY RING FURNACE ABOVE A CIRCULAR FOREHEARTH

[76] Inventor: Warren W. Drummond, 3721 S.W. 84th St., Gainsville, Fla. 32608

[21] Appl. No.: 08/859,198

[22] Filed: May 20, 1997

Related U.S. Application Data

[60] Provisional application No. 60/018,181, May 23, 1996.

[51] Int. Cl.$^6$ .................................................. C03B 37/022
[52] U.S. Cl. ................................. 65/475; 65/482; 65/540; 65/134.7
[58] Field of Search .............................. 65/482, 475, 540, 65/134.7

[56] References Cited

U.S. PATENT DOCUMENTS

| | | | |
|---|---|---|---|
| Re. 32,317 | 12/1986 | Kunkle et al. | 65/135 |
| 1,889,509 | 9/1932 | Amsler . | |
| 1,889,511 | 7/1932 | Amsler . | |
| 2,006,947 | 6/1935 | Ferguson | 49/53 |
| 2,007,755 | 7/1935 | Ferguson | 13/6 |
| 3,285,720 | 11/1966 | Drummond | 65/1 |
| 3,754,886 | 8/1973 | Richards | 65/134.7 |
| 4,061,487 | 12/1977 | Kiyonaga | 65/135 |
| 4,185,984 | 1/1980 | Kiyonaga | 65/135 |
| 4,337,073 | 6/1982 | Drummond | 65/1 |
| 4,738,938 | 4/1988 | Kunkle | 65/134.7 |

OTHER PUBLICATIONS

Lowenstein, The Manufacturing Technology of Continuous Glass Fibres, Elsiver Publishing, 1973, pp. 40–56; 60–70; 89–101; 106–110; 116; 29–30; 31–36.

*Primary Examiner*—John Hoffman
*Attorney, Agent, or Firm*—Nora C. Peace; John E. Curley

[57] ABSTRACT

A process and apparatus are described for forming glass fibers which utilizes a rotating melter for the fiber glass batch materials and stators which house the fiber forming bushings. The stators are encompassed by the rotating melter, but not physically touching it. The glass melt flows directly from the melter to the bushings in the stators and temperatures at the bushings are controlled by raising or lowering the stator with respect to the melter, the bushings being devoid of any electrical energy input as is conventionally practiced.

15 Claims, 5 Drawing Sheets

PROCESS OF MAKING FIBERS WITH A ROTARY RING FURNACE ABOVE A CIRCULAR FOREHEARTH

This Application is a completed Application based upon my Provisional Application No. 60/018,181, filed May 23, 1996 for Fiber Glass Melting and Forming Apparatus.

The present invention relates to melting glass making ingredients. More particularly the present invention relates to melting fiberglass making ingredients to form a homogeneous molten glass mixture. Still more particularly the present invention relates to melting fiberglass making ingredients to form a homogeneous molten glass mixture and delivering the molten glass mixture so formed to a forehearth having a plurality of fiberglass forming bushings attached to it in a manner that provides uniform temperatures and proper viscosity to the glass exiting the fiberglass bushings to form glass fibers. Finally, the present invention relates to a method of melting fiberglass making ingredients to provide uniform temperature and viscosity to the glass at the fiber forming stations while dramatically reducing the energy requirements for forming glass fibers including what is used to melt the glass ingredients as well as the energy used to maintain the glass molten until delivered to the forming station and through the bushing apertures over those commonly required by existing commercial processes.

BACKGROUND OF THE INVENTION

In modern fiberglass manufacturing, large glass melting furnaces are employed to melt the glass making ingredients. The furnaces are typically elongated, rectangular shaped brick structures lined internally with specialized refractories. Glass making ingredients are fed into one end of the furnace and molten glass is removed from the other end and passed to a forehearth. The forehearth is typically of considerable length and has attached to its underside a plurality of fiber forming bushings or stream feeders through which the molten glass in the forehearth flows to form the glass fibers. Gas burners are provided along the length of the forehearth to heat the molten glass as it passes from the furnace through the forehearth to the bushings and to maintain it at satisfactory temperatures to provide the optimum viscosity for the glass as it passes through the bushings for fiber formation. In the textbook, "The Manufacturing Technology of Continuous Glass Fibers", by K. L. Lowenstein, Elsiver Scientific Publishing Co., New York, N.Y., 1973, typical furnaces used for producing glass fibers are described in detail on pages 40–56. Similarly, the typical forehearths used in direct melt operations today, and their energy supply systems, are described on pages 60–70.

The bushings used to form the fibers are electrically resistance heated platinum or platinum alloy structures which need transformers attached to them by suitable connections to terminals provided on the bushings to supply power to them. In addition, water cooling is required to seal the glass around the bushing assembly attached to the forehearth and thereby eliminate glass leaks. The terminal clamps for transformer connection require cooling and the nozzle shields or fin coolers which are typically placed between the rows of forming tips on the fiber forming bushing base plates also require cooling. The fin cooler or nozzle shields are described by the aforementioned Lowenstein text on pages 106–110 and a typical water cooled bushing terminal clamp is depicted in FIG. v/17 on page 116 of the same reference.

Experience has shown that it has been impossible to obtain uniform heat at every aperture in a fiber forming bushing because of their shape and the environment variations inherent in the construction of the bushings and associated equipment as well as the competing cooling systems used to try and control the thermal environment as the fibers are formed and collected. Non-uniform temperatures at the fiber forming tips on a fiber glass bushing result in fiber diameter variations that can be as much as 2 to 1 between tips. This represents a 4 to 1 variation in mass.

Little change has occurred in the fiber glass industry over this type of glass forming operation except that the furnaces have become bigger, forehearths longer and the number of bushings per furnace has been increased as well as individual bushing size in terms of number of forming tips per bushing. This expansion in size has meant development and use of more expensive temperature controls for the resistance heated bushings, bulkier transformers for current supply, more sophisticated and controlled cooling systems for the transformer clamps on the bushings, the bushing fin coolers used adjacent the bushing tips and the reactors used to regulate the energy supplied to the resistance heated bushings.

Still with all of this expenditure of capital the variations at the fiber forming tips while improved over the earliest days of the industry still leave a lot to be desired. Thus the bushings still experience variations in fiber diameter from tip to tip that can be improved upon considerably. Further, the electrical systems and cooling requirements necessary to achieve the current and less than ideal variation in fiber diameters during formation involve large capital expenditures and considerable amounts of energy all of which can be saved with a more efficient melting and forming process.

In U.S. Pat. No. 3,285,720 a new approach to feeding glass is described using a siphon bushing from a hot glass melt. A much more uniform fiber pack in a strand was observed with this process because of the more uniform temperatures in the tip plate. When this was attempted with a series of siphon bushings along a flow channel, the output from one bushing to another was found to be different, however. Since the flow channel had no internal method for controlling temperature along the entire channel, output differences were determined to be due to variations in glass viscosity along the glass channel.

In another U.S. Pat. No. 4,337,073 a process is described in which a circular forehearth is used to feed glass to bushings positioned thereon as opposed to the typical elongated forehearth and bushing arrangements used in the industry today. This process involved feeding molten glass to a rotating forehearth section which in turn streamed uniform hot glass into a chamber in which unheated (i.e. no resistance heating applied) bushings were attached. The rotary forehearth section was heated by central gas burner and internal radial gas passages located in the rotor. While some uniformity of fibers was demonstrated by this process, the forehearth arrangement was intricate and required a gas distribution system in the rotor to provide uniform temperatures throughout from a central source.

Thus, despite all of the efforts made to date, a need still exists to provide a more simple approach to glass fiber forming which will deliver quality uniform fibers while minimizing investment and reducing energy requirements for fiberization. The applicant's novel process provides a method of accomplishing these goals.

SUMMARY OF THE INVENTION

In accordance with the instant invention fiberglass formation is enhanced by providing bushing tips having uniform temperatures with a substantial reduction in the amount of energy consumed per pound of fiber produced and a significant reduction in capital investment. These ends are accomplished by providing all melted glass used to form fibers in a rotating melter which melts and homogenizes the glass ingredients as they are rotated. The melter delivers the molten glass to a circular, stationary forehearth positioned directly below it from which the bushings are suspended in the conventional manner except that no external cooling fins are necessary. The temperature of glass fed to the bushings is controlled by the temperature of the glass exiting the rotating melter. The circular forehearth receives sufficient energy from the bottom refractory of the rotating melter and the molten glass fed to it to fully support the required cooling as the glass passes from the forehearth to the tip plate to insure optimum fiber forming viscosity in the glass. The rate of cooling in accordance with one aspect of the invention is adjustable by moving the forehearth section vertically toward or away from the rotating melter so that optimum glass temperatures and consequently viscosities of the glass are realized as the molten glass leaves the bushing and is formed into fibers.

BRIEF DESCRIPTION OF THE DRAWINGS

For a more complete understanding of the invention and the various embodiments thereof reference is made to the accompanying drawings in which.

DETAILED DESCRIPTION OF THE DRAWINGS

Figure 1:
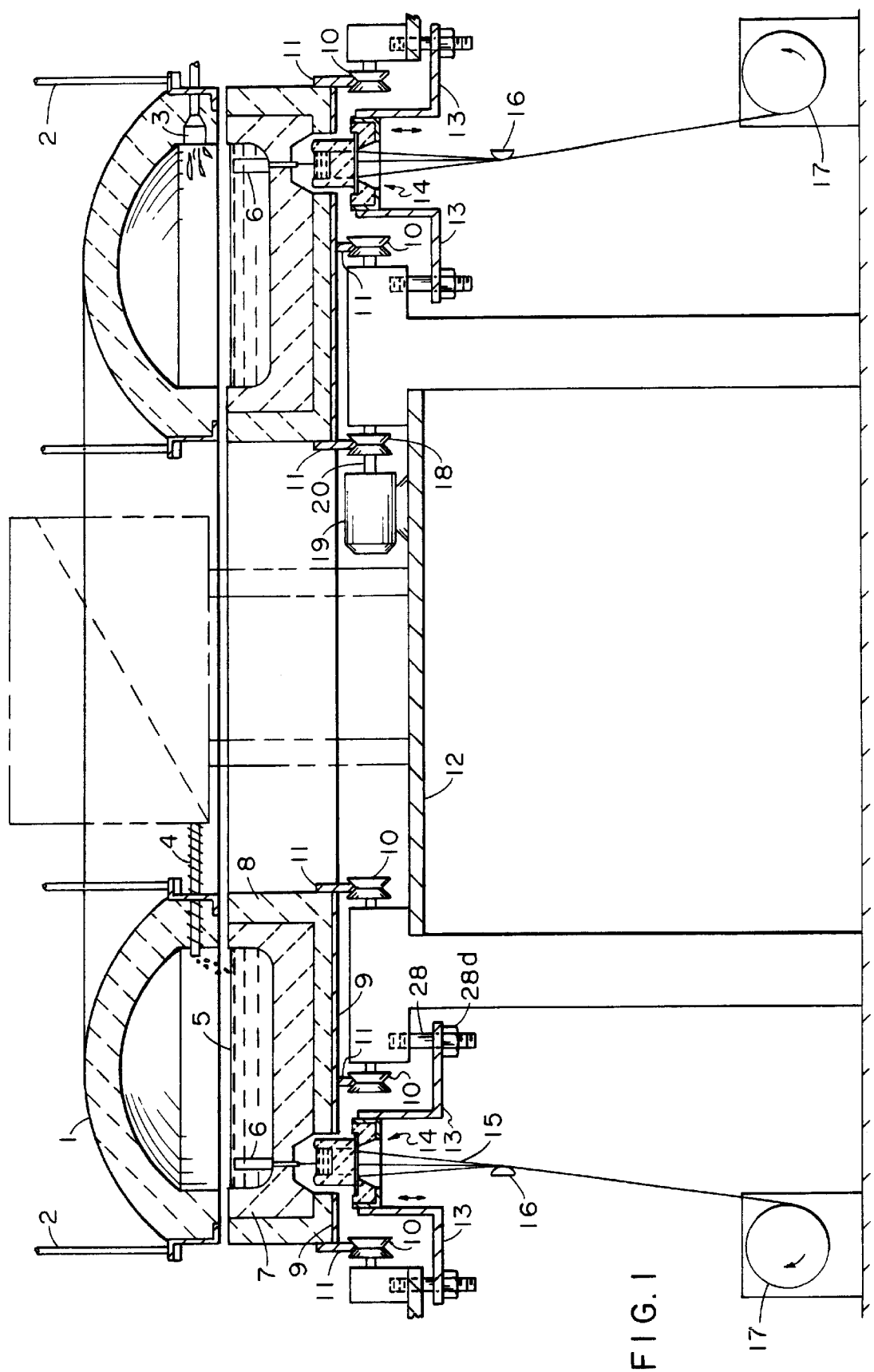
FIG. 1 shows a cross-section of one embodiment of the instant invention involving a circular, ring shaped rotatable furnace.

Turning to FIG. 1 there is shown a circular ring furnace having a stationary dome or cover 1. Cover 1 is supported by cables or rods 2 which are secured to the building structure (not shown) around the entire ring shaped furnace. Burners 3 are provided around the inner surface of the dome 1 at spaced intervals and are positioned to burn natural gas, propane or oil mixed with oxygen or air and direct the resulting energy tangentially around the walls of the dome and the surfaces of the glass melt 5. The lower section or base of the furnace has an outer shell of insulative refractory 8 which is supported on a metal plate 9. A glass carrying refractory 7 which may be constructed of chrome oxide, dense zircon or other refractories not readily corroded by molten glass or combinations of these is provided. This refractory 7, as shown, is shaped to provide a receptacle of some depth to carry the molten glass 5. The entire revolving or rotating section of the furnace carrying the molten glass is supported on idler rollers or wheels 10 via brackets 11, which are attached to the outer wall of the furnace. A drive wheel 18 journaled to motor 19 on drive shaft 20 moves the furnace as the wheel engages the brackets 11. The building floor 12 supports motor 19.

As seen in the drawing, a screw feeder 4 introduces the glass making ingredients through the dome 1 along the outside wall of the melting chamber. As the ingredients melt, the molten fluid will flow gradually to the overflow platinum or platinum/rhodium alloy tubes 6 positioned in the interior of the melter some distance from the outer wall. A number of these tubes 6 are provided and they pass through refractory 7 and into a stationary chamber or stator 14 which receives the molten glass uniformly from tubes 6. Stator 14 is supported by support arms 13 which are movable up and down so that stator 14 can be positioned any desired, fixed distance from refractory 7.

The conditioned molten glass 5 passing into stator 14 moves through holes in tip plates 21 located on the bottom of stator 14. The fibers 15 formed as the molten glass passes through the tip plate 21 are gathered together at the gathering shoe 16 and wound onto a mandrel 17 in the conventional manner.

Figure 2:
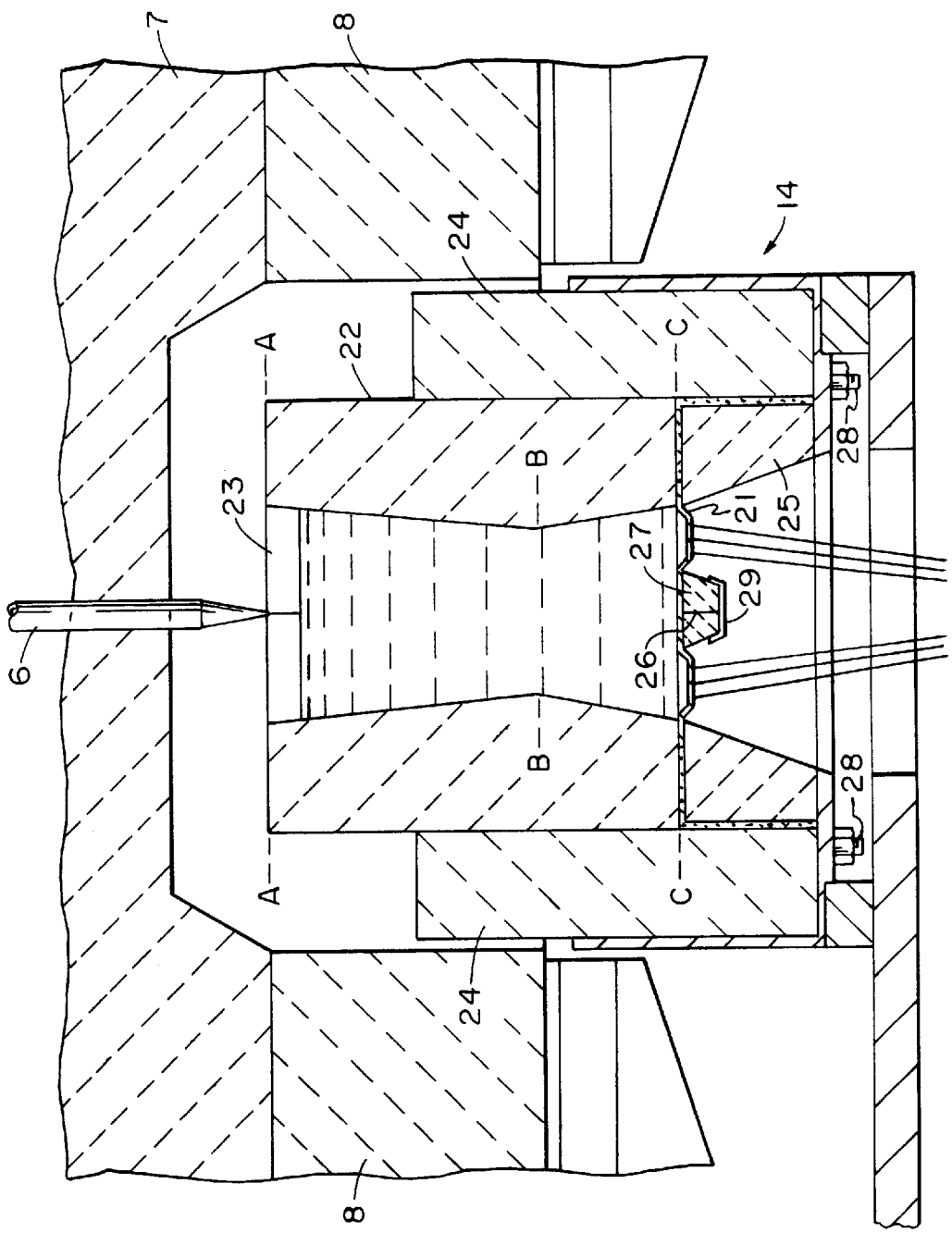
FIG. 2 shows an enlarged cross-section of the stator 14 of FIG. 1 taken at a bushing center.
Figure 2A:
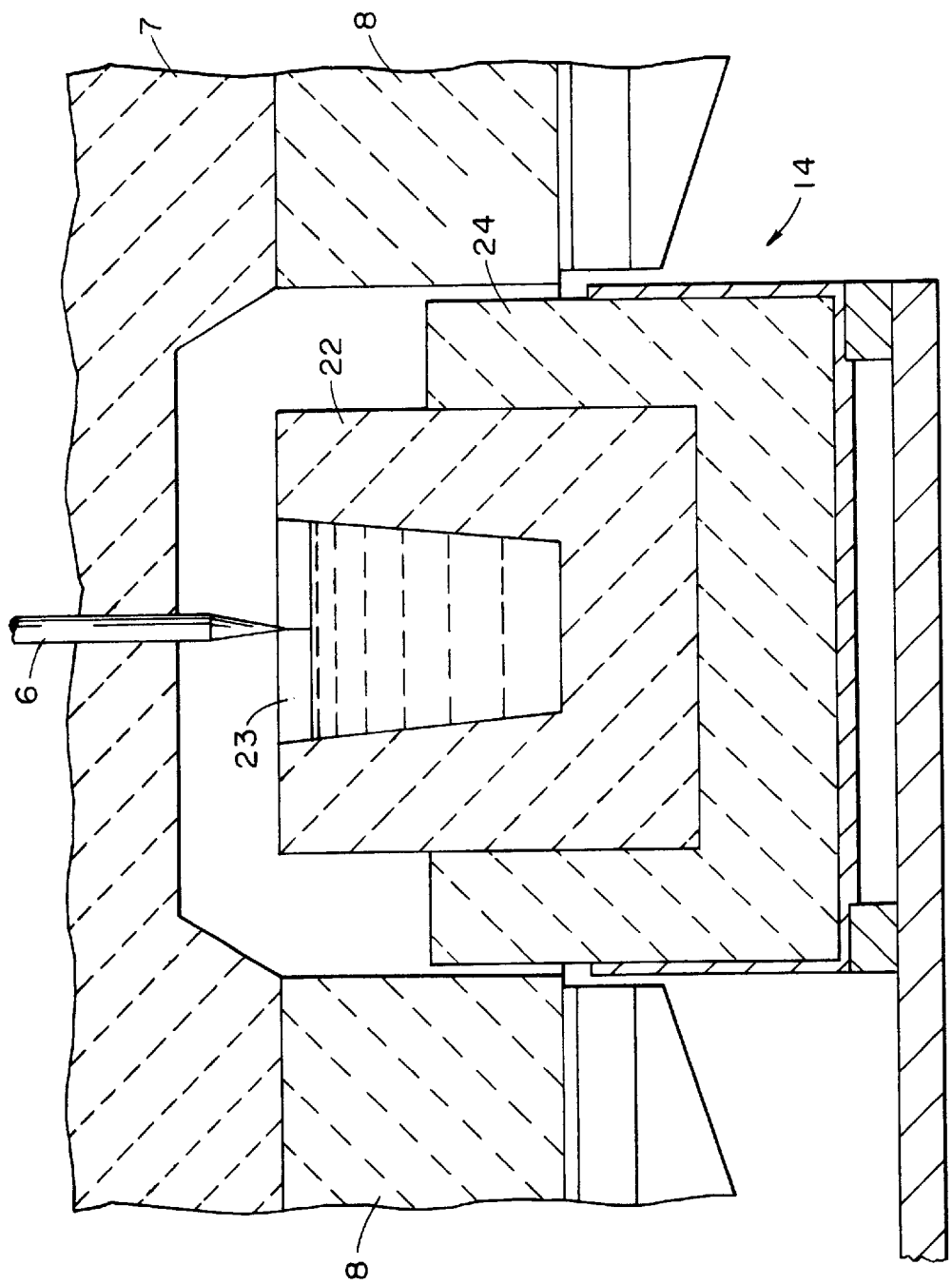
FIG. 2A shows an enlarged cross-section taken between a bushing center.

FIG. 2 and FIG. 2A which are enlarged sectional views of the stator 14 of FIG. 1 shows the refractories 7 and 8 surrounding the stator 14. These views represent a one-half scale representation of the continuous glass containing channel 23 shown therein. The refractories 7 and 8 of the rotor partially encapsulate the stator 14 and consequently heat is transferred through the rotor refractories 7 and 8 to the stator 14. Further heat is supplied to the stator 14 by the hot molten glass 5 flowing from the rotor through tubes 6 into the interior of the stator 14. The molten glass flowing into the stator 14 is collected in a circular block of chrome refractory 22 which is provided with a hollowed central cavity forming the channel 23 in which the molten glass flowing from tubes 6 accumulates. The refractory 22 is tapered inwardly from the top at line A—A to line B—B. The refractory 22 forming this channel 23 is also tapered outwardly at the bushing positions beginning at line B—B and terminating at lines C—C. This provides tapered holes in the channel 23 to permit glass therein to flow downwardly and outwardly to the bushing or tip plate 21. The tip plate 21 is typically a platinum or platinum/rhodium plate having a multitude of hollow tips stamped therein. The tips are provided with holes in the conventional manner practiced commercially today and described by Lowenstein in his book, "The Manufacturing Technology of Continuous Glass Fibers" 1973, Elsiver Publishing Co. at pages 89–101. Insulation blocks 25 are used to tightly affix the bushing or tip plate 21 against the circular refractory 22 of the stator 14 and the insulation refractory 24 thereof. Since the bushing 21 is unheated electrically like a conventional bushing it acts as a cooling mechanism so that long tips at the bushing are not necessary to create the cooling required for achieving optimum attenuation viscosities in the glass passing through them. The small center insulation piece 27 is held in place with a thin platinum cup 29 fastened to the tip plate 21 by wire 26. As before described with reference to FIG. 1, the entire stator assembly 14 is supported by support arms 13 which as shown in FIG. 1 are adjustable in a vertical direction. As previously discussed, this permits movement of the stator vertically with respect to the rotating furnace so that glass temperatures at the bushing can be controlled to provide the desired viscosities for fiber formation. Arms 13 attached to the stator 14 are adjusted by moving the nut 28d engaged on bolt 28 upwardly or downwardly in response to any abnormal temperature change that needs correction.

Figure 3:
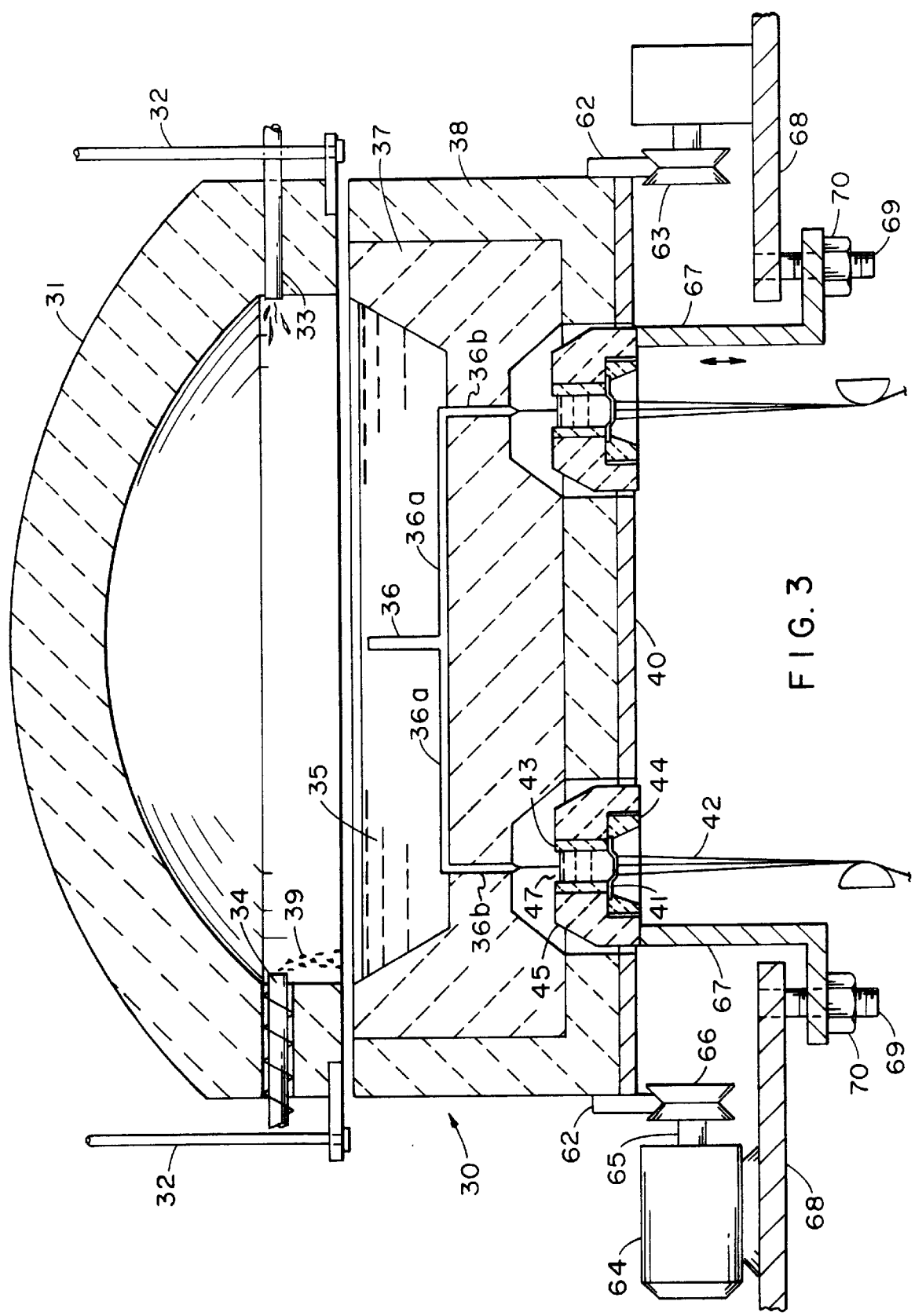
FIG. 3 shows a cross-section of the preferred embodiment of a rotatable circular furnace.

FIG. 3 shows another and the preferred embodiment of the invention in cross-section. As shown in this figure, a circular furnace generally indicated as 30 is provided with a dome or crown 31 of silica brick or mullite which is held in place by rods 32.

The bottom of the furnace 30 is constructed of glass compatible refractory 37 which is typically chrome oxide and/or dense zircon refractory which forms the receptacle for the molten glass 35. The refractory 37 is enclosed in insulative refractory 38 typically a dense silica brick which rests on a steel plate 40 forming the bottom of the rotating furnace. Tangentially directed oil or gas and oxygen or air burners 33 are provided at spaced intervals around crown 31 to supply sufficient heat to melt the glass ingredients 39 being fed to the furnace 30 by the screw conveyor 34. One or more feed conveyors may be used if desired. The ingredients 39 are melted as the furnace under the dome 31 rotates and as shown the resulting molten glass is drawn from the furnace through a platinum or platinum/rhodium tube 36 located in the center of the melter. At the base of tube 36, several connecting smaller tubes 36a extend outwardly and then are directed down through the bottom refractory 37 as illustrated by 36b which feeds small glass streams into the stator channel 47. Thus, while two such positions are shown, several others are present around the periphery of the furnace. As the furnace rotates, glass is delivered at a constant rate and temperature through feed tubes 36b into the continuous open channel 47 of the stator which may be looked at as a stationary circular forehearth. Unlike the typical forehearth, however, glass mainly subsides therein with very little horizontal flow occurring. The glass will continue to subside through the holes at bushing centers which are spaced evenly around the stator unit below the channel 47. The bushings 41 from which glass fibers 42 are shown streaming are held up against block 43 by the refractory blocks 44. The insulating refractory block 45 encompasses the circular glass channel block 43 and holes are cut at bushing centers to accommodate blocks 44. Looking at FIG. 2, the tip plate 21 is held tightly to block 22 by blocks 25 with mechanical pressure being applied by lugs 28. A similar arrangement (not shown) is used on blocks 44. This pressure is necessary to maintain a seal. The block 43 having the open channel of glass and the holes at bushing centers forms a reservoir 47 for the molten glass 35 as it passes from feed tubes 36b and this reservoir 47 feeds the glass 35 to the bushing 41, which is provided with a plurality of hollow tips that permit glass to flow through and to form glass fibers 42 which will be attenuated into glass strand in the conventional manner practiced in the art today. Rotation of the furnace under dome 31 is provided through a plurality of idler rollers or wheels 63 which are supported by brackets 62 attached to the side of the furnace. A motor 64 provides power through a drive shaft 65 to wheel 66 which engages bracket 62 and provides motive force thereto. Wheels 63 which are spaced around the periphery of the furnace are free wheeling and move once the motor driven wheel 66 begins to move.

The stators housing the bushings 41 are vertically adjustable and are adjusted in response to any variation in temperature at the bushing openings that adversely affect the formation of fibers. This adjustment is provided by supports 67 which rest against the refractory 45 at one end thereof. At the opposite ends of supports 67 they are fastened to the floor 68 on which the furnace wheels 63 and 66 are supported and, by bolts 69 which are threaded and to which nuts 70 are secured. The supports 67 are moved up or down by rotating the threaded nut 70 on threaded bolt 69. These nuts 69 may be rotated to move the supports 67 up or down by hand or if desired can be coupled to suitable mechanical and electrical automation which is triggered by responses to variations in temperature sensed at given bushings as they may arise to thereby raise or lower that bushing in relationship to its position inside of the rotor to bring it back to its optimum operating temperature.

Figure 4:
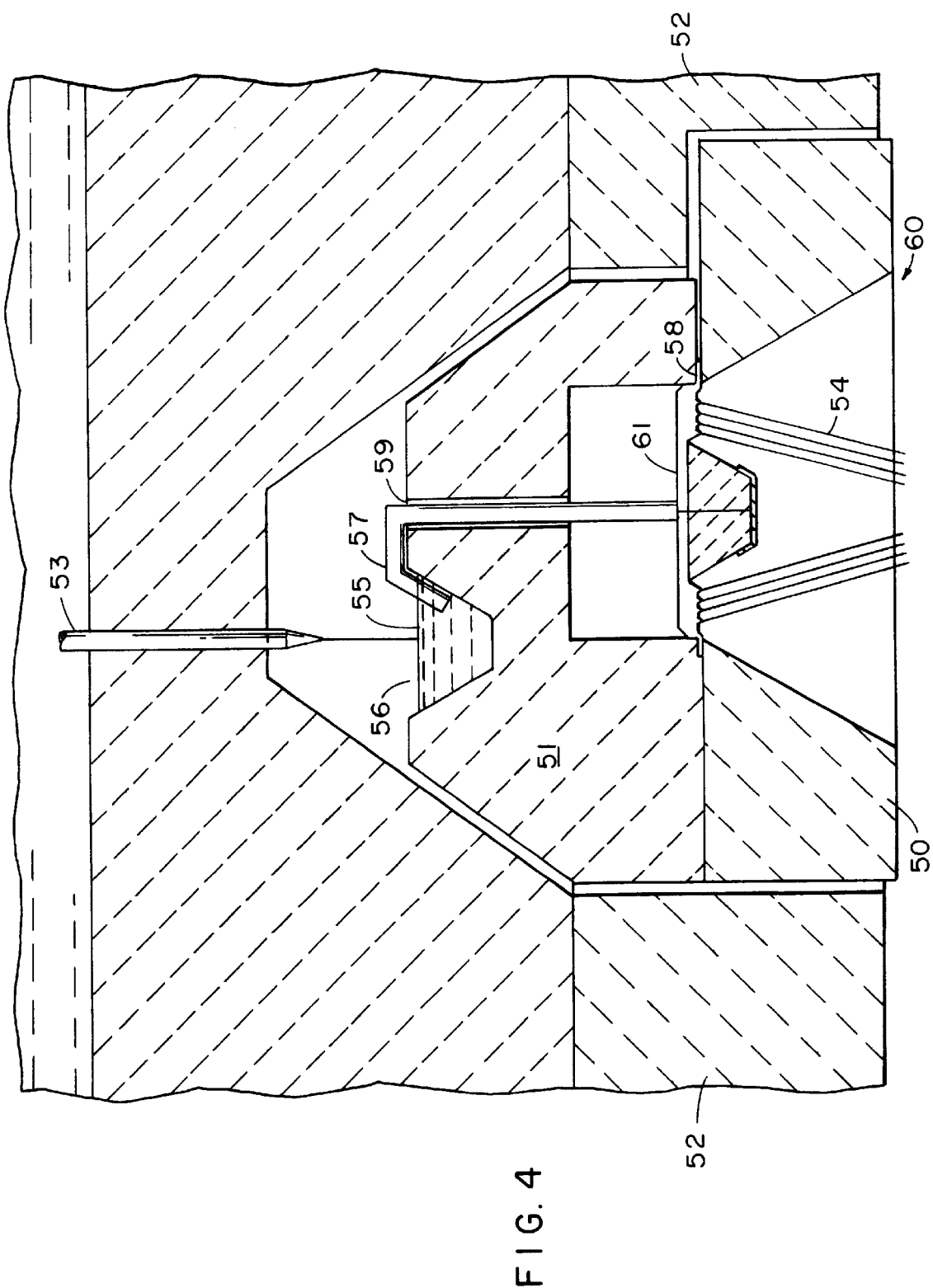
FIG. 4 shows an alternative stator for use with the rotating furnaces of FIG. 1 using siphon bushing feeders.

FIG. 4 is a cross-section of an alternate stator using a siphon bushing such as described and claimed in my U.S. Pat. No. 3,285,720. As shown in this figure, molten glass from a rotating furnace such as shown in FIG. 1 or FIG. 3 flows through tube 53 into an open channel 56 of the stator assembly generally indicated as 60. This glass forms a pool of molten glass 55 in channel 56 which is constructed of a glass compatible material such a chrome and/or zircon.

The refractory 51 forming channel 56 is provided with vertical slots 59 which are wide enough to accommodate the neck of the syphon tube 57. The syphon 57 assembly is raised through the slot and is then turned 90 degrees and lowered to the position shown. The tip plate 61 is slightly smaller than the hole in block 51 to allow the placement of the syphon 57. After the syphon 57 is in place, a small sealing packing is placed to keep the syphon 57 in place. Glass 55 from channel 56 can then be brought into tip plate 61 by air suction beneath the tip plate 61. The bushing 61 is mounted to the chrome refractory 51 by insulative refractory blocks 50 and refractory insulation 52. The bushing 61 is again a platinum or platinum/rhodium alloy with a plurality of holes forming tips in its bottom so that molten glass can freely flow therethrough. Typically these bushings have a flange 58 around their periphery, which extends into the space between refractory blocks 50 and refractory 51 to hold the bushing 61 firmly in place. The fibers 54, leaving the bushing 61 are collected in the conventional manner as shown, for example, in FIG. 1.

The rotation of the ring furnace of FIG. 1 or the circular furnace of FIG. 3 can be accomplished in several ways. One preferred method of doing it involves the use of the system described by my U.S. Pat. No. 4,337,073. In this instance a motor and drive shaft would be used and the drive shaft would be journaled to a drive wheel whose surface is in contact with the bottom 9 of the furnace of FIG. 1, for example, or the bottom 40 of the furnace of FIG. 3 as another example. Idler wheels would be provided in these arrangements around the periphery of the furnace bottom 9 or 40 respectively and in contact with the underside thereof so that movement of about the motor driven wheel would move the idlers and consequently the furnace in a rotating motion. Typically, the melter will rotate at speeds to provide outside wall movement of above 30 to 60 feet per minute. Other movement arrangements are also contemplated such as moving the furnaces on tracks with appropriate wheels driven by electric or gas motors and idler wheels.

The batch compositions or ingredients used to prepare glass fibers are typically "E" glass, "C" glass, "A" glass and "S" glass. These glass compositions are well known in the art. "E" glass is the most widely used glass and may vary in its constituent make-up and the weight percent of components and still be considered "E" glass. Examples of these compositions are shown in detail by the Lowenstein reference referred to above at Pages 29–30 and are incorporated herein by reference as are the form of minerals used to supply the various ingredients which are similarly discussed in that same reference at Pages 31–36.

Bushings used in accordance with the invention are as previously noted devoid of electrical heating and thus do not require the typical bushing ears for use in clamping the transformers thereto. The bushings, however, will be typically equipped with thermocouples (not shown in the drawings) which will in turn be connected to a monitor or recorder that the operator can monitor to insure that temperatures stay within an acceptable range for optimum fiber forming. Should any unacceptable temperature manifest itself, the stator is moved either up or down until an acceptable temperature at the bushing is again established. A typical thermocouple of the type used in a bushing is shown in the cross-section Figure V/8 shown by the Lowenstein reference hereinabove referred to at Page 100 thereof. While the control of stator movement can be manually applied by use of conventional microprocessing equipment responsive to electronic signals from thermocouple reads from the bushings the stators can be made mechanically responsive to move up or down from a given position with respect to the rotating melter.

In practicing the instant invention in accordance with the preferred embodiment contemplated by the inventor the following steps may be undertaken, using a furnace such as depicted in FIG. 3. An "E" glass composition containing in weight percent 53.4 $SiO_2$, 14.4 $Al_2O_3$, 8.4 $B_2O_3$, 3.1 MgO, 18.9 CaO, 0.2 $NA_2O$, 0.9 $K_2O$, 0.4 $Fe_2O_3$ and 0.5F. is fed from a batch house through a screw conveyor 34 to a rotatable circular-shaped furnace 30. Burners 33 which typically are burning natural gas and oxygen provide heat to the furnace to establish temperatures therein in the range of 2400° F.(1315° C.) to 2800° F.(1537° C.) The molten glass 35 formed by melting the glass ingredients 39, is mixed by rotating the melter formed from refractory 37 and refractory 38 and supported by the steel bottom support 40. Rotation is accomplished by driving wheel or roller 66 from motor 64 and its drive shaft 65, which engages the wheel 66. Idler wheels or rollers 63 are spaced around the periphery of the furnace bottom support 40 and support linear speeds of 30 to 60 feet per minute which are typical for the rotating furnace 30 riding on the floor 68. Floor 68 also has affixed to it a plurality of brackets 67 which engage the several stator refractory blocks 45 at one end and are anchored to floor 68 with threaded bolts 69 at their other ends. Bolts 69 are provided with threaded nuts 70, which when turned clockwise or counterclockwise raise or lower brackets 67 and consequently the stator blocks and related stator and bushings 41 in relation to their position inside of the rotating melter. The stators carrying bushings 41 are placed in the spaces formed by the refractories 37 and 38 at the melter and as the melter discharges glass through the overflow tube 36, the side tubes 36a and 36b which empty molten glass to the stator reservoirs 47 and permit it to flow through bushings 41 the temperatures are noted by thermocouple readings from each bushing and the stator assembly is adjusted by the brackets 67 being lowered or raised until the bushing temperatures reach uniform temperatures in the range of 1900° F.(1037° C.) and 2220° F.(1204° C.). As the glass streams pass from the melt 35 at tube 36 until it reaches the underside of the bushings 41, heat is constantly removed by the refractories 37 and 38 of the rotating melter and the refractories 43 and 45 of the stator assembly. To reduce it from the furnace melt temperatures to the forming temperatures at the bushing sites.

The invention, as will be appreciated by the skilled artisan, provides several important and distinct advantages over the current state of the art. The precious metal used to construct bushings is reduced considerably, approximately 50 to 75 percent, since the bushings no longer require precious metal terminals for connection to conventional transformers for heating. Further, since the bushings are not heated, the cooling necessary to achieve proper viscosity for attenuation is provided by using shorter tips than is customary. Fabrication costs to produce tips is reduced since shorter tips are used, which require much less metal working than the conventional longer ones. The elaborate cooling systems for fin coolers is no longer required, nor is cooling of transformer terminals necessary since none are required for the bushings.

Another advantage is that furnaces of the type contemplated can be smaller in size, but are still capable of handling many bushings. The absence of the elongated forehearth requiring gas heating typical of those used in modern fiber glass plants today also contributes to providing considerably lower energy costs. Glass, once in a molten state, is passed almost directly to the forming bushings over a drastically reduced furnace molten glass to bushing pathway requiring no external gas or electric heat. Heat is supplied to the molten glass in the revolving furnace by the gas burners, but the molten glass after passing down the feed tubes to the stator holding the bushings, no longer requires heating by external burners as used in conventional forehearths since it passes directly through the bushing. Heat instead is extracted from the glass by the refractory of the rotating furnace itself to reduce the temperature of the glass to satisfactory forming temperatures in the stator that it surrounds until it passes out of the bushings at the base thereof.

Finally, since the bushings and the stator holding them can be adjusted in their spatial relationship to the revolving furnace, cooling can be adjusted in this way without the necessity of cooling a bushing that is constantly heated by electrical resistance heating as practiced by the current art. In addition, the transformer and associated control systems regulating their output are completely eliminated. Thus, bushing temperature and glass viscosities are controlled simply by movement of the bushings upwardly or downwardly in relation to the glass melt issuing from the rotating furnace.

While the invention has been described with reference to certain specific illustrative embodiments, and a theoretical example of how to practice the invention in connection with the preferred disclosed embodiment it is not intended that the invention be limited thereby except insofar as appears in the following claims.

I claim:

1. A method of preparing glass fibers comprising continuously feeding fiber glass forming batch ingredients to a glass melting furnace, heating the furnace to temperature sufficient to melt the glass forming batch ingredients, mixing the molten glass by rotating the melting furnace in a horizontal plane, continuously removing molten glass from the furnace through precious metal tube positioned in the furnace, delivering the molten glass from said tube to a circular forehearth comprising fiber forming stator assembly including a chamber formed of walls of insulation and at spaced intervals a floor consisting of fiber forming bushings and insulation, said stator assembly walls being surrounded in part by insulation forming the bottom and sidewalls of the rotating melter, providing sufficient heat into the furnace to heat the insulation of the furnace and through indirect heat exchange therewith the walls and bottom of the stator which, coupled with the molten glass delivered thereto insures that the fiber forming bushings are maintained at temperatures lower than the temperatures of the molten glass exiting the furnace but high enough to sustain adequate fiber forming temperatures in the glass exiting the bushing to thereby form streams of glass fibers for collection into glass fiber strand.

2. The method of claim 1 wherein the glass melt furnace is ring shaped.

3. The method of claim 1 wherein the furnace is rotated in a horizontal plane around the stator and the stator is moved vertically into or away from the furnace insulation surrounding its walls in response to temperature changes detected in the bushings during fiber forming to thereby maintain desirable fiber forming viscosities.

4. The method of claim 1 wherein the furnace is circular in shape and is rotated in a horizontal plane around the stator and wherein molten glass is removed through a tube positioned away from the sidewalls of the furnace and is passed to a plurality of horizontally disposed tubes located below the glass melt surface that deliver the molten glass outwardly toward the furnace walls and downwardly through the furnace insulation and terminate in the stator and above the bushings located therein and deliver the molten glass thereto at sufficient temperature to support fiber formation.

5. The method of claim 1 wherein fiber glass forming batch ingredients are fed to the rotating furnace from a stationary dome covering the furnace but spaced above it and heat is supplied to the furnace through burners spaced along the periphery of the dome.

6. The method of claim 1 wherein the glass fibers produced are "E" glass fibers.

7. The method of claim 1 wherein the glass fibers produced are "C" glass fibers.

8. The method of claim 1 wherein the temperature of the molten glass leaving the furnace through the tube is between about 2400° F. and 2800° F. and leaving the bushing is between 2200° F. and 1900° F.

9. The method of claim 1 wherein the stator is moved vertically into or away from the furnace insulation in response to temperature changes during forming to maintain optimum glass fiber forming viscosities at the bushings.

10. The method of claim 1 wherein the furnace is circular in shape and is rotated around and above the circular stator assembly and the molten glass removed through the tube positioned away from the furnace side wall and is passed to a plurality of horizontally disposed feed tubes located below the molten glass surface which deliver the molten glass outwardly toward the furnace walls and downwardly through the furnace insulation and empty into the stator assembly of the circular forehearth above the bushings located therein at temperatures sufficient to support fiber formation.

11. A method of forming glass fibers comprising feeding fiber glass batch to rotating furnace, said furnace rotating in a horizontal plane heating the fiber glass batch to temperatures sufficient to melt the ingredients, passing the molten glass resulting from melting to a circular stationary forehearth comprising a stator located below and partially surrounded by but not in physical contact with the rotating furnace, said stator being movable in a vertical direction closer to or away from said furnace, positioning a series of fiber forming bushings on the underside of said stator and in fluid communication therewith, passing the molten glass from the stator through the said bushings to form glass fibers and gathering and collecting the glass fibers as they form on exiting the said bushing as fiber strands.

12. The method of claim 11 wherein the furnace is ring shaped.

13. A method of producing glass fibers comprising feeding glass fiber batch ingredients to a glass circular melter rotating in a horizontal plane, rotating and operating the melter at temperatures sufficient to melt the batch ingredients, melting and homogenizing the ingredients as they rotate in the melter to produce uniform molten glass, delivering the molten glass from the melter to a circular stationary forehearth positioned directly below the melter and around which the melter rotates and form which bushings for forming glass fibers are suspended around its periphery, supplying sufficient energy to the forehearth from the insulation of the rotating melter and the molten glass being fed to the forehearth to fully support the cooling as glass passes from the forehearth through the bushing to thereby form glass fibers.

14. In the process of claim 13 the step of controlling the rate of cooling by moving the forehearth vertically toward or away from the rotating melter insulation to maintain optimum glass temperatures for glass fibers.

15. The method of claim 14 wherein the fiber glass forming batch ingredients are fed to the rotating furnace from a stationary dome covering the furnace but spaced above it, and heat is supplied to the furnace through burners spaced along the periphery of the dome.

* * * * *

UNITED STATES PATENT AND TRADEMARK OFFICE
CERTIFICATE OF CORRECTION

PATENT NO.   : 5,928,401
DATED        : July 27, 1999
INVENTOR(S)  : Warren W. Drummond It is certified that error appears in the above-indentified patent and that said Letters Patent is hereby corrected as shown below:

Title page, item [54], and col. 1,
The title is corrected to read:

"Process for Forming Fibers Using a Rotating Furnace Positioned above a Circular Stationery Forehearth Containing Fiber Forming Bushings."

Signed and Sealed this

Seventh Day of March, 2000

Attest:

Q. TODD DICKINSON

Attesting Officer

Commissioner of Patents and Trademarks